(12) United States Patent
Cocks (10) Patent No.: US 10,883,274 B1
(45) Date of Patent: Jan. 5, 2021

(54) HORIZONTAL PANEL ALIGNMENT SYSTEM

(71) Applicant: Ryan Cocks, Maple Ridge (CA)

(72) Inventor: Ryan Cocks, Maple Ridge (CA)

(73) Assignee: Vancouver Glazing Hardware Inc., Surrey (CA)

( * ) Notice: Subject to any disclaimer, the term of this patent is extended or adjusted under 35 U.S.C. 154(b) by 0 days.

(21) Appl. No.: 16/567,929

(22) Filed: Sep. 11, 2019

(51) Int. Cl.
| E04F 11/18 | (2006.01) |
| E06B 3/58 | (2006.01) |
| E06B 3/54 | (2006.01) |
| F16B 7/04 | (2006.01) |
| F16B 2/00 | (2006.01) |

(52) U.S. Cl.
CPC ............. *E04F 11/1812* (2013.01); *E06B 3/54* (2013.01); *E06B 3/58* (2013.01); *F16B 2/00* (2013.01); *F16B 7/04* (2013.01)

(58) Field of Classification Search
CPC ............... E04F 11/1812; E04F 11/1853; E04F 11/1834; E04F 11/1851; E06B 3/54; E06B 3/58; F16B 2/00; F16B 7/04
See application file for complete search history.

(56) References Cited

U.S. PATENT DOCUMENTS

| 2009/0031653 A1* | 2/2009 | Nash ...................... E06B 3/5454 52/238.1 |
| 2015/0240851 A1* | 8/2015 | Giacometti ......... E04F 11/1812 403/374.3 |
| 2015/0267415 A1* | 9/2015 | Zhou ................... E04F 11/1812 52/208 |
| 2016/0265232 A1* | 9/2016 | Noble ................. E04F 11/1834 |
| 2016/0281366 A1* | 9/2016 | Spence ............. E04F 11/1812 |
| 2017/0058928 A1* | 3/2017 | Barnes ................. F16B 5/0614 |
| 2017/0101784 A1* | 4/2017 | Gonzato ............. E04F 11/1853 |
| 2017/0292274 A1* | 10/2017 | Downs ............... E04F 11/1812 |
| 2019/0177973 A1* | 6/2019 | Mitrovic ................... E04H 4/14 |
| 2019/0249442 A1* | 8/2019 | Strehlow ............. E04F 11/1817 |
| 2019/0301168 A1* | 10/2019 | Noble ............... E04F 11/1812 |
| 2020/0087919 A1* | 3/2020 | Ravan ................. E04F 11/1853 |

FOREIGN PATENT DOCUMENTS

| EP | 2921607 A3 * | 1/2016 | .......... E04F 11/1812 |
| EP | 3009580 A1 * | 4/2016 | .......... E04F 11/1853 |
| EP | 3323958 B1 * | 9/2019 | ............. F16B 9/023 |
| FR | 3017909 A1 * | 8/2015 | ............. F16B 9/023 |
| FR | 3055138 A1 * | 2/2018 | .......... E04F 11/1812 |

* cited by examiner

*Primary Examiner* — Babajide A Demuren

(74) *Attorney, Agent, or Firm* — Stratford Managers Corporation (57) ABSTRACT

A system is disclosed for holding a panel in a u-channel comprising a rocking grip configured to be positioned in the u-channel on a first side of the panel and a tilting grip configured to be positioned in the u-channel on a second side of the panel, opposite the first side for adjusting an angular position of the panel. The rocking grip includes a rotatable rocking plate for abutting the first side of the panel. The tilting grip includes a tilting plate for abutting the second side of the panel a moveable top cam for rotating the tilting plate in a first direction and a moveable bottom cam for rotating the tilting plate in a second direction, opposite the first direction.

4 Claims, 7 Drawing Sheets

HORIZONTAL PANEL ALIGNMENT SYSTEM

REFERENCE TO PENDING APPLICATIONS

This application does not claim the benefit of any pending application.

BACKGROUND OF THE INVENTION

1. Field of the Invention

The present invention relates generally to the field of panel railings, and more specifically, to a system for holding a panel using a u-channel.

2. Description of the Related Art

Panel railings, such as glass railings, are commonly installed on a substrate using u-channel base shoe with grips inside. Current systems available in the marketplace require time consuming shimming of the u-channel to plumb the adjacent panels and often require specialized tools for their installation. These requirements cost consumers extra expense creating a need for a product that allows simple and cost-effective installation of panels eliminating the need for shimming u-channel specialized tools. There is also a need for adjusting the panel only from on one side of the panel.

BRIEF SUMMARY OF THE INVENTION

The present system satisfied the needs set out above.

In one aspect, a system for holding a panel in a u-channel comprising a rocking grip configured to be positioned in the u-channel on a first side of the panel and a tilting grip configured to be positioned in the u-channel on a second side of the panel, opposite the first side for adjusting an angular position of the panel. The rocking grip includes a rotatable rocking plate for abutting the first side of the panel. The tilting grip includes a tilting plate for abutting the second side of the panel a moveable top cam for rotating the tilting plate in a first direction and a moveable bottom cam for rotating the tilting plate in a second direction, opposite the first direction.

The features of the invention which are believed to be novel are particularly pointed out in the specification. The present invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

BRIEF DESCRIPTION OF THE DRAWINGS

Some embodiments of the present invention are illustrated as an example and are not limited by the figures of the accompanying drawings, in which like references may indicate similar elements.

The various embodiments of the present invention will hereinafter be described in conjunction with the appended drawings, wherein like designations denote like elements.

DETAILED DESCRIPTION

The present invention is directed to a system for holding a panel using a u-channel that satisfies the needs set out above.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise.

Unless otherwise defined, all terms (including technical and scientific terms) used herein have the same meaning as commonly understood by one having ordinary skill in the art to which this invention belongs.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Figure 1:
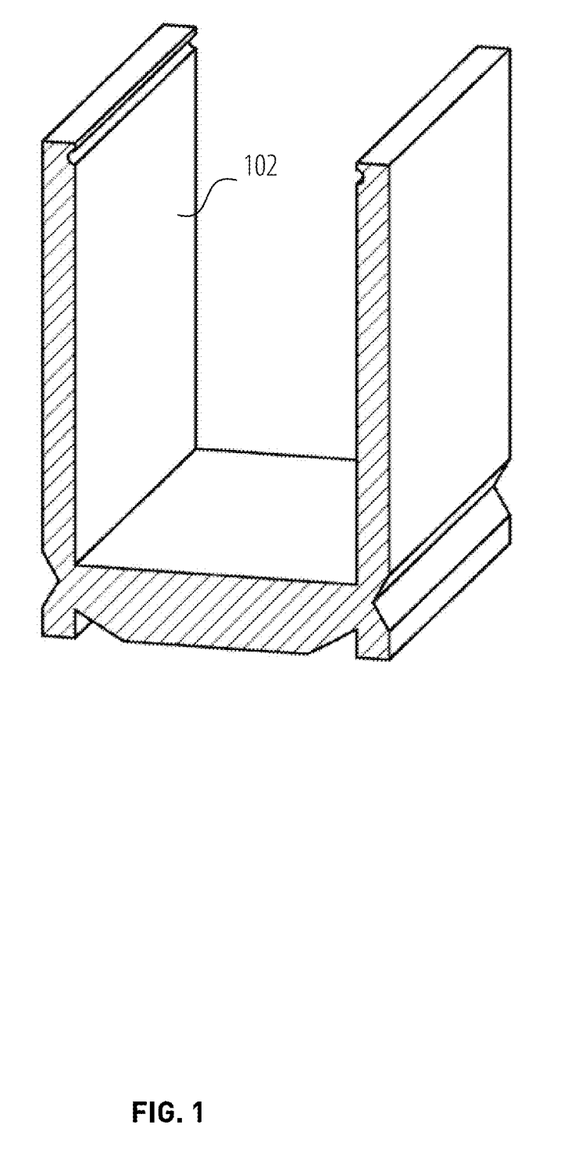
FIG. 1 illustrates a base shoe in accordance with one embodiment.

FIG. 1 depicts an example of a section of a base shoe 100 with a u-channel 102, which would normally extend the width or length of a panel 602. The base shoe 100 is generally comprised of aluminum, but any other suitable material known in the art can be used. The base shoe 100 is secured to a substrate (not shown), generally using lag bolts or epoxy anchors, but any other means of securing the base shoe 100 known in the art can be used.

Figure 2:
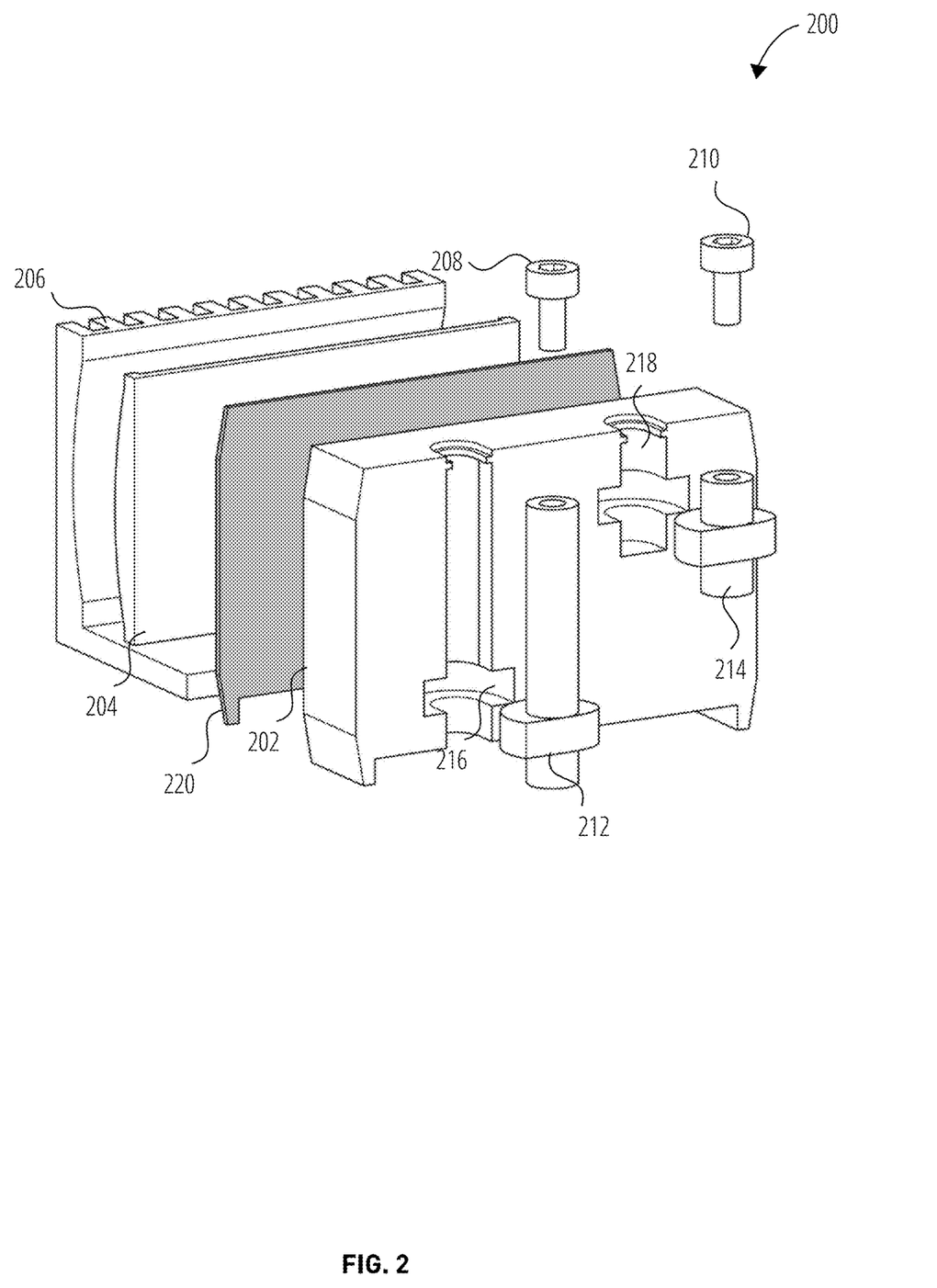
FIG. 2 illustrates a panel locking mechanism in accordance with one embodiment.

In one embodiment, a panel locking mechanism 200 for holding the panel 602 substantially vertical in the u-channel 102 of the base shoe 100 comprises a rocking grip 206 mounted in the u-channel 102 on one side of the panel and a tilting grip 202 mounted in the u-channel 102 on the opposite side of the panel 602. The rocking grip 206 includes a rocking plate 204 for abutting against the panel 602.

The rocking grip 206 may include a concave inner surface and a flat outer surface adjacent to the wall of the u-channel 102. The rocking plate 204 may include a convex inner surface mating with the concave inner surface of the rocking grip 206 and a flat outer surface on the other side for abutting the panel 602. The convex inner surface of the rocking plate 204 is configured to slide and rotate relative to the concave inner surface of the rocking grip 206, when a force is applied to the flat outer surface of the rocking plate 204 by the panel 602, thereby enabling lateral adjustment of the panel 602 when being fixed in the u-channel 102 in a horizontal plane, while keeping a constant force on the panel 602 and a tight seal.

The tilting grip 202 may include a tilting plate 220 for abutting the panel 602. The tilting grip 202 may include a top cam hole 218 and a bottom cam hole 216. The top cam hole 218 may extend from the top of the tilting grip 202 down to a desired location in the upper half of the tilting grip 202, e.g. substantially down a quarter of the height of the tilting grip 202. The top cam hole 218 may include a first elongated cylindrical section and a first recess, which extends through the tilting grip 202. The bottom cam hole 216 may extend from the top of the tilting grip 202 down to a desired location in the bottom half of the tilting grip 202, e.g. substantially the bottom of the tilting grip 202. The bottom cam hole 216 may include a second elongated cylindrical section and a second recess, which extends through the tilting grip 202.

The top cam hole 218 may be configured to receive a top cam 214 which may include a first cam section mounted in the first recess, extending from a first elongated, e.g. cylindrical, tube, rotatable in the first cylindrical section. The top of the top cam 214 may include an adjustment feature for facilitating rotation of the top cam 214 via a suitable tool, e.g. screw driver or Allen key. For example, a top cam fastener 210 may be coupled with the top of the top cam 214 tube.

The bottom cam hole 216 may be configured to receive a bottom cam 212 which may comprise a second cam mounted in the second recess extending from a second longer elongated, e.g. cylindrical, tube, rotatable in the second cylindrical section. The top of the bottom cam 216 may include an adjustment feature for facilitating rotation of the bottom cam 216 via a suitable tool, e.g. screw driver or Allen key. For example, a bottom cam fastener 208 may be coupled with the top of the bottom cam 212.

Figure 3:
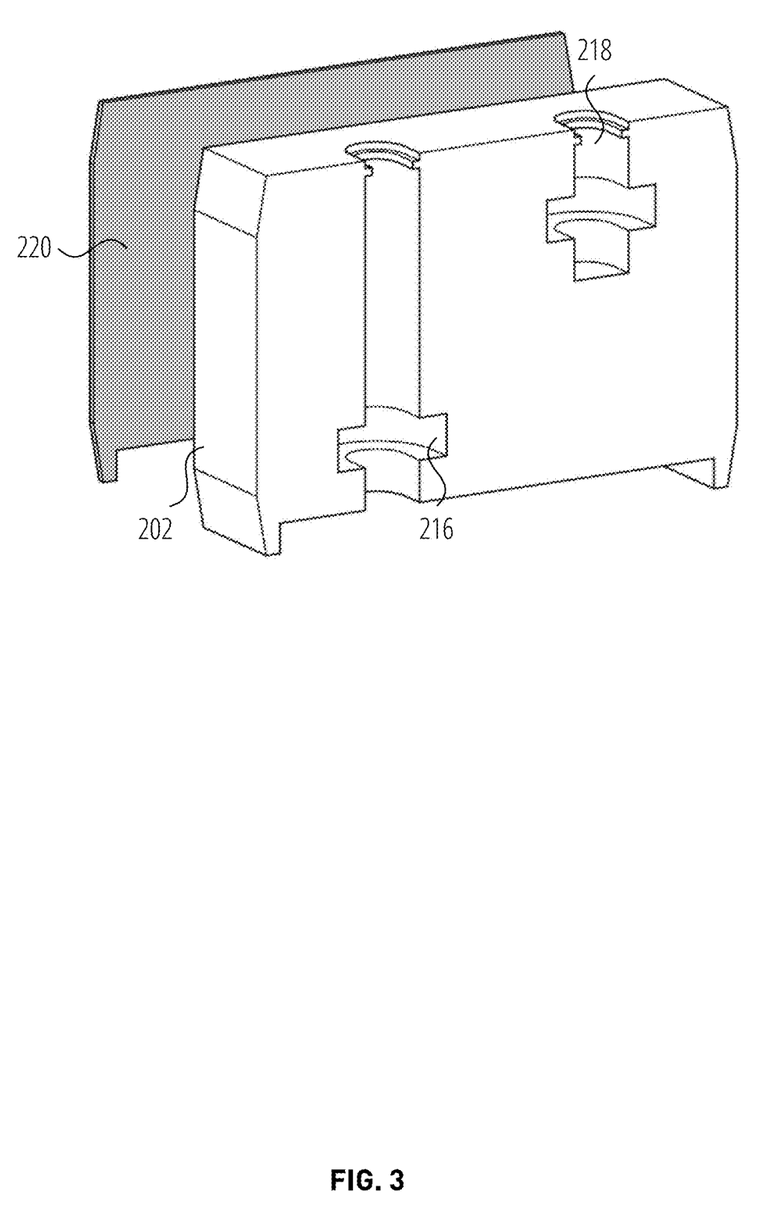
FIG. 3 illustrates a tilting grip in accordance with one embodiment.

FIG. 3 depicts a different view of the tilting grip 202 with the tilting plate 220 and the top cam hole 218 and bottom cam hole 216. The first recess of the top cam hole 218 extends through the tilting grip 202 enabling the first cam section to contact the top of the tilting plate 220. The second recess of the bottom cam hole 216 extends through the tilting grip 202 enabling the second cam section to contact the bottom of the tilting plate 220.

Figure 4:
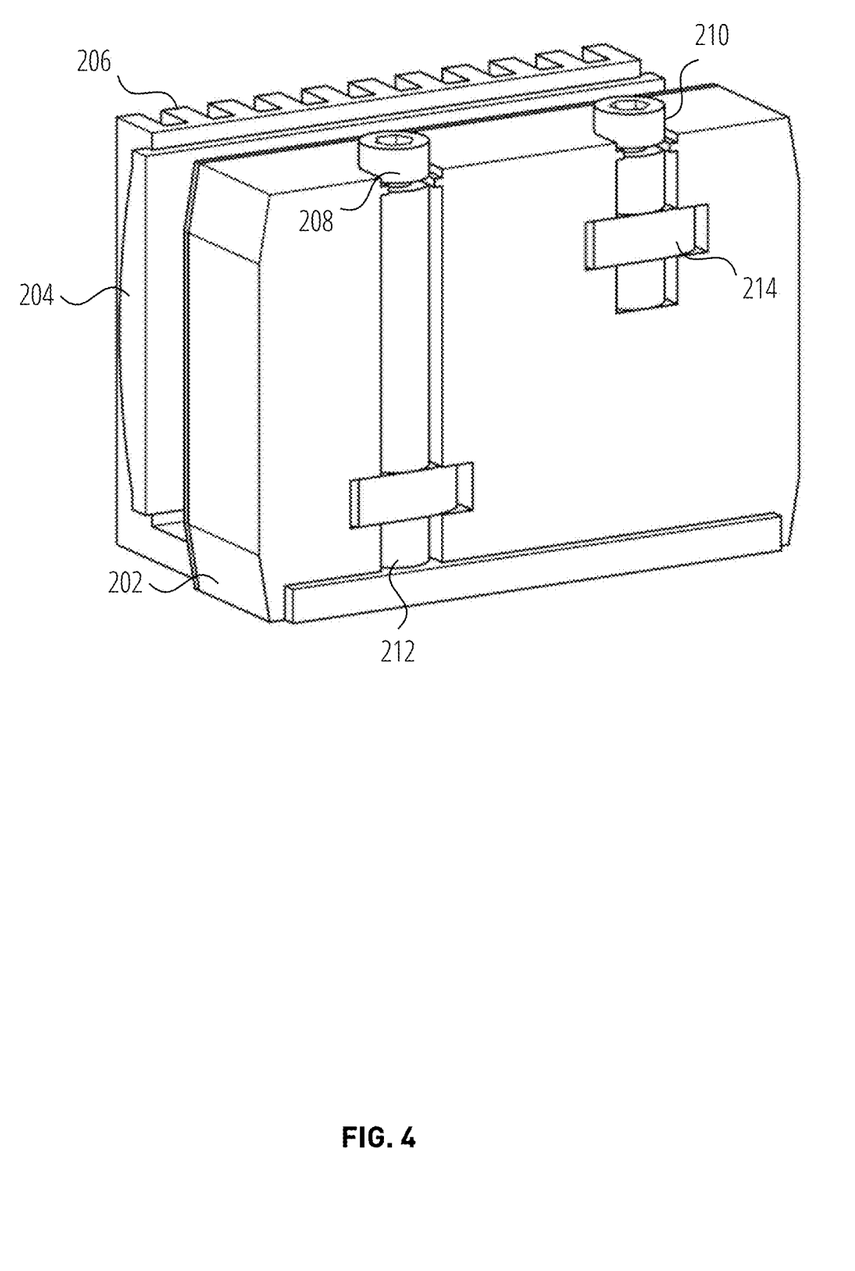
FIG. 4 illustrates a panel locking mechanism in accordance with one embodiment.

FIG. 4 depicts a different view of the tilting grip 202 with the top cam 214 and top cam fastener 210 fitted in the top cam hole 218. The top cam 214 fits in the top cam hole 218 such that the side of tilting grip 202 holding the top cam 214 is flat for positioning up against the inner wall of the u-channel 102. The bottom cam 212 and bottom cam fastener 208 also fit on the side of the tilting grip 202 such as the side of the tilting grip 202 is flat for positioning up against the inner wall of the u-channel 102.

Figure 5:
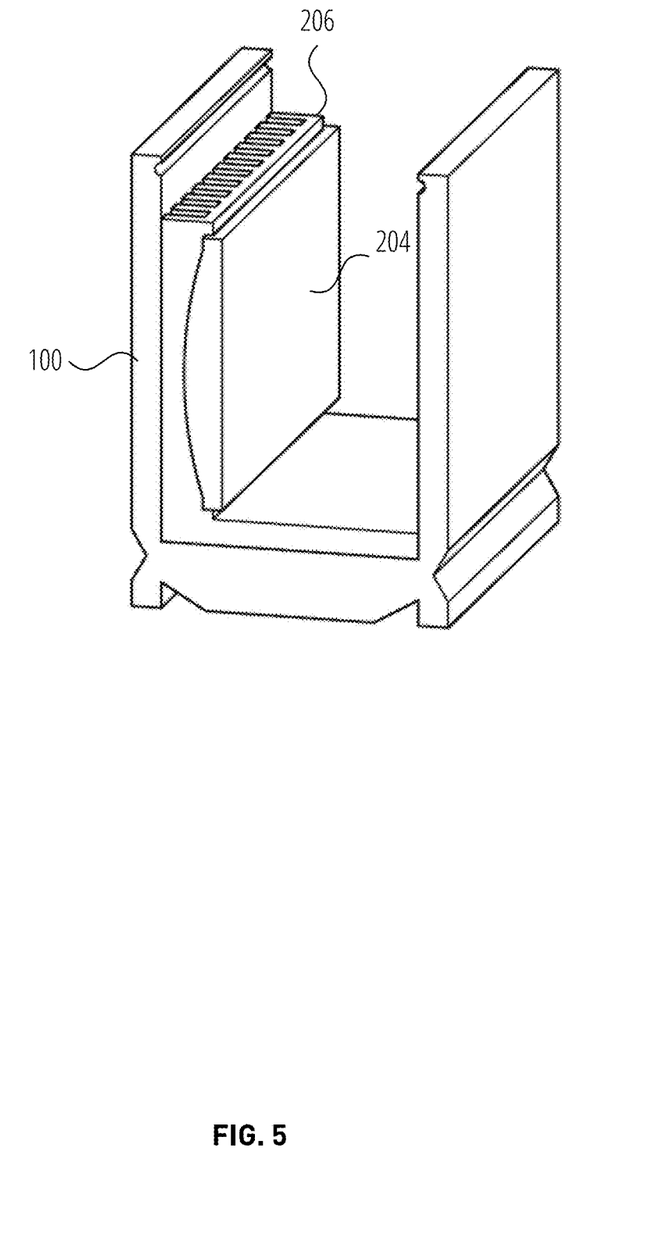
FIG. 5 illustrates a rocking grip in a base shoe in accordance with one embodiment.

FIG. 5 illustrates the rocking grip 206 and rocking plate 204 installed in the base shoe 100.

Figure 6:
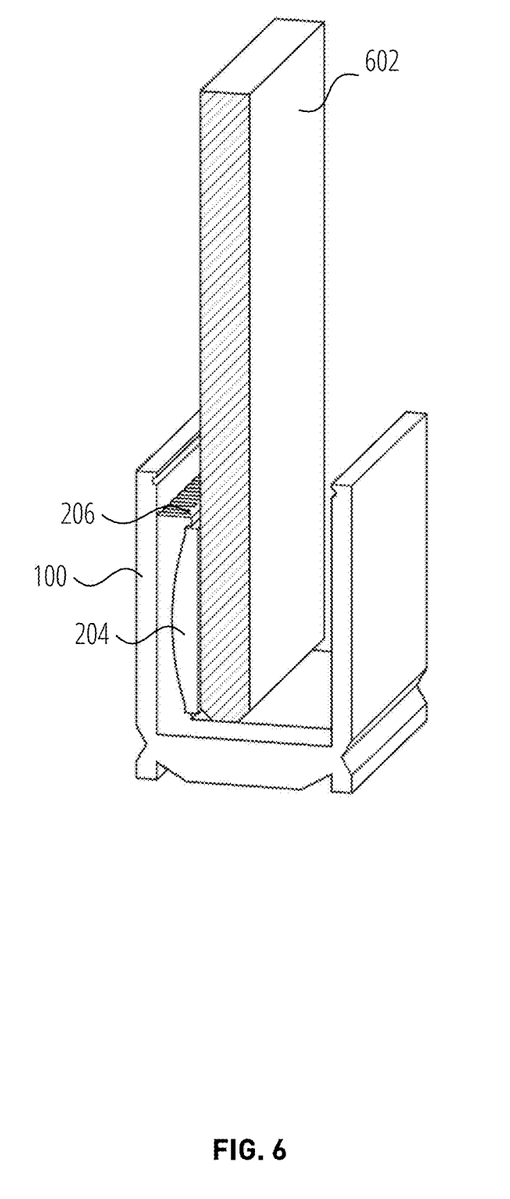
FIG. 6 illustrates a rocking grip in a base shoe and a panel in accordance with one embodiment.

FIG. 6 illustrates the rocking grip 206 installed in the base shoe 100 with the panel 602 supported on the rocking plate 204. Movement of the rocking plate 204 relative to the rocking grip 206 enables the lateral position of the panel 602 in the base shoe 100 to be adjusted.

Figure 7:
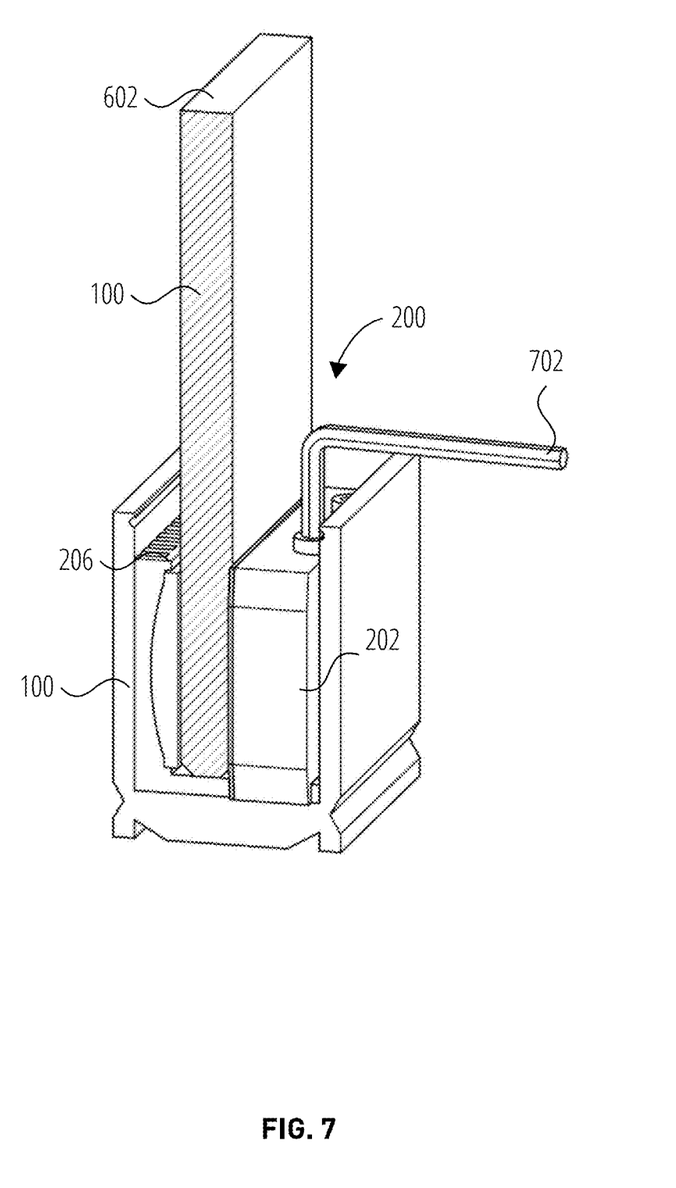
FIG. 7 illustrates a rocking grip in a base shoe with a panel and a tilting grip in accordance with one embodiment.

FIG. 7 illustrates the rocking grip 206 installed in the base shoe 100 with the panel 602 supported on the rocking plate 204 for lateral adjustment of the panel 602. The tilting grip 202 and tilting plate 220 are inserted on the other side of the panel 602 inside the base shoe 100 for angular adjustment of the panel 602.

A tool 702, for example, but not limited to, an Allen key or a screwdriver, is inserted in the top cam adjustment feature, e.g. fastener 210, to rotate the top cam 214, thereby rotating the first cam section into contact with the top of the tilting plate 220, which moves towards the panel 602 and produces a horizontal force against the panel 602 at a position spaced from the bottom, thereby rotating the panel 602 in a first direction, e.g. counterclockwise, and fixing the panel 602 in place in the u-channel 102. When the top cam screw 210 is loosened, i.e. the first cam section is rotated away from the tilting plate 220, and/or the bottom cam screw 208 is tightened, i.e. the second cam section is rotated into contact with the bottom of the tilting plate 220, which moves towards the panel 602 and produces a horizontal force against the panel 602 at a position proximate the bottom thereof, thereby rotating the panel 602 in a second opposite direction, e.g. clockwise, the panel 602 may be rotated, pushed back to the right, and fixed in position in the u-channel 102. By adjusting both adjustment features, it is possible to properly horizontally and vertically align the panel 602 even if the base shoe 100 or the u-channel 102 is not shimmed. When the tilting plate 220 is moved, e.g. rotated, at the top or bottom depending on which of the top cam 214 or bottom cam 212 is moved, the rocking plate 204 slides in the rocking grip 206 accordingly to keep a constant pressure on the panel 602.

Using the two adjustment features during installation into the u-channel 102, the lateral and angular position of the panel 602 can be adjusted for easy plumbing with adjacent panels.

The adjustment can be made by manipulating the two adjustment features that are on the same side of the panel 602 without requiring to reach out to the other side and without requiring special tools.

The exact specifications, materials used, and method of use may vary upon manufacturing.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment(s) were chosen and described in order to best explain the principles of the present invention and its practical application, to thereby enable others skilled in the art to best utilize the present invention and various embodiments with various modifications as are suited to the particular use contemplated.

What is claimed is:

1. A system for holding a panel in a u-channel comprising:
    a rocking grip configured to be positioned in the u-channel on a first side of the panel; and
    a tilting grip configured to be positioned in the u-channel on a second side of the panel, opposite the first side for adjusting an angular position of the panel;
    wherein said rocking grip includes a rotatable rocking plate for abutting the first side of the panel;
    wherein said tilting grip includes:
        a tilting plate for abutting the second side of the panel;
        a moveable top cam for rotating the tilting plate in a first direction;
        a top cam adjustment coupled to said movable top cam such that rotation of said top cam adjustment rotates said moveable top cam;
        a moveable bottom cam for rotating the tilting plate in a second direction, opposite the first direction; and a bottom cam adjustment coupled to said movable bottom cam such that rotation of said bottom cam adjustment rotates said moveable bottom cam.

2. The system of claim 1 wherein said top cam includes a first cam section extending from a first cylindrical section; and wherein said top cam is configured to apply a force to the top of said tilting plate when said top cam is actuated.

3. The system of claim 1 wherein said bottom cam includes a second cam section extending from a second cylindrical section; and wherein said bottom cam is configured to apply a force to the bottom of said tilting plate when said bottom cam is actuated.

4. The system of claim 1 wherein said rocking grip includes a concave surface configured to be coupled with a convex surface of the rocking plate, whereby the panel is laterally adjustable, and the rocking grip maintains a seal on the panel when the tilting grip adjusts the position of the panel.

\* \* \* \* \*